(12) United States Patent
Vargas et al.

(10) Patent No.: US 9,181,688 B2
(45) Date of Patent: Nov. 10, 2015

(54) TOILET VALVE FLOAT MECHANISM

(75) Inventors: Matt Vargas, San Jose, CA (US); Zaafir Kherani, Boston, MA (US); Tom Stout, San Jose, CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 449 days.

(21) Appl. No.: 13/447,945

(22) Filed: Apr. 16, 2012

(65) Prior Publication Data

US 2012/0260412 A1    Oct. 18, 2012

Related U.S. Application Data

(60) Provisional application No. 61/476,676, filed on Apr. 18, 2011.

(51) Int. Cl.
| | | |
|---|---|---|
| *E03D 1/00* | (2006.01) | |
| *E03D 1/14* | (2006.01) | |
| *E03D 1/33* | (2006.01) | |
| *F16K 33/00* | (2006.01) | |

(52) U.S. Cl.
CPC *E03D 1/144* (2013.01); *E03D 1/33* (2013.01); *F16K 33/00* (2013.01)

(58) Field of Classification Search
CPC ......... F16K 31/18; F16K 31/24; F16K 31/26; E03D 1/14; E03D 1/141; E03D 1/142; E03D 1/33; G01F 23/30; G01F 23/56; G01F 23/76
USPC ............... 4/324–327, 331, 391, 395; 137/426
See application file for complete search history.

(56) References Cited

U.S. PATENT DOCUMENTS

| | | | | |
|---|---|---|---|---|
| 4,335,741 A | * | 6/1982 | Nasser | 137/426 |
| 4,357,720 A | * | 11/1982 | Stahli | 4/378 |
| 4,714,088 A | * | 12/1987 | Ivins | 137/426 |
| 4,937,895 A | * | 7/1990 | Stevens | 4/324 |
| 5,040,247 A | * | 8/1991 | Stevens | 4/324 |
| 5,659,903 A | * | 8/1997 | Hammarstedt | 4/325 |
| 5,715,859 A | * | 2/1998 | Nichols-Roy | 137/426 |
| 5,738,141 A | * | 4/1998 | Blanke et al. | 137/414 |
| 5,896,593 A | * | 4/1999 | Mizrahi | 4/378 |
| 6,478,044 B2 | * | 11/2002 | Howe | 137/414 |
| 6,666,228 B1 | * | 12/2003 | Li | 137/426 |
| 6,920,649 B2 | * | 7/2005 | Oury | 4/325 |
| 2008/0295238 A1 | | 12/2008 | Hawley | |
| 2009/0199911 A1 | * | 8/2009 | Schuster et al. | 137/426 |
| 2009/0276946 A1 | * | 11/2009 | Dayton et al. | 4/324 |
| 2010/0024114 A1 | * | 2/2010 | Hand | 4/395 |

OTHER PUBLICATIONS

PCT International Search Report, Jun. 16, 2012.

* cited by examiner

*Primary Examiner* — Lauren Crane
*Assistant Examiner* — Erin Deery
(74) *Attorney, Agent, or Firm* — Gordon Rees Scully Mansukhani LLP

(57) ABSTRACT

A toilet valve float adjustment assembly, including: a dual flush valve; a pair of floats disposed within the dual flush valve, wherein the vertical position of one of the floats determines the flush volume for a full flush and the vertical position of the other float determines the flush volume for a partial flush; a pair of adjustment mechanisms, wherein each adjustment mechanism adjusts the vertical height of one of the floats; and a pair of locking mechanisms, wherein each locking mechanism inhibits movement of one of the adjustment mechanisms, thereby keeping its float at a preferred vertical height when locked, and wherein the adjustment and locking mechanisms are controlled at the top of the dual flush valve.

19 Claims, 5 Drawing Sheets

TOILET VALVE FLOAT MECHANISM

RELATED APPLICATION

The present application claims priority to U.S. Provisional Patent Application 61/476,676, filed Apr. 18, 2011, of the same title, incorporated herein by reference in its entirety.

TECHNICAL FIELD

The present invention relates generally to float height adjustment of mechanisms controlling water storage and delivery devices, and in particular to toilet dual flush valves.

BACKGROUND OF THE INVENTION

Most conventional residential toilets make use of a supply of water in a tank mounted above the toilet bowl. Water from the tank is released into the bowl to flush waste from the bowl down into the waste drain. Various types of mechanisms within the tank typically serve to control the flow of water to the bowl and subsequently to replenish the water in the tank. For example, floats are often employed by these mechanisms to control the amount of water that is flushed and replenished.

Setting the vertical position of these floats is a desirable way to adjust the amount of water that is flushed and replenished. Unfortunately, many toilet mechanisms employ float adjustments that are difficult to use and often require the hand of the user to be submerged in the tank. Furthermore, locking the float in position, once it has been adjusted, can be cumbersome and ineffective. This is especially true for dual flush toilets in which two different floats are used, with one controlling the flush volume for a full (solid waste) flush, and another controlling the flush volume for a partial (liquid only waste) flush.

As will be show, the present invention provides a float adjustment mechanism that may be adjusted easily and intuitively. A single mechanism (e.g.: a first dial) can be used to adjust the full flush float and another mechanism (e.g.: a second dial) can be used to adjust the partial flush float. A benefit of the present invention is to create a float adjustment mechanism that may be adjusted with limited water contact to the user's hand. A further advantage of the present invention is to create a float adjustment mechanism incorporating a simple and secure float locking capability. It is to be understood that although the present invention is preferably used in a dual flush toilet (to adjust both partial and full flush volumes), it can also be used in a traditional single flush toilet (having only one float).

SUMMARY OF THE INVENTION

The present invention provides a float adjustment mechanism. In one preferred embodiment, the float adjustment mechanism is used in a dual flush toilet system. It is to be understood, however, that the present invention is not so limited. It may be used on any float height adjustment system. It is not limited to use with toilets at all, or to use with dual flush toilets in particular. In one exemplary embodiment, the present invention controls movement of a single float, in another embodiment, the present invention controls movement of a pair of floats.

In one preferred aspect, the present invention provides a float mechanism having a pair of height adjustment knobs/dials located on the top of a dual flush toilet valve. In this particular embodiment, one adjustment knob controls the full flush volume and the other controls the partial flush volume. Pushing and then rotating each of these knobs results in respective float movement vertically along a rotating adjustment member. Advantageously, each float automatically locks in position when its associated knob is released and automatically unlocks when the knob is depressed resulting in a simple and intuitive adjustment.

In preferred embodiments, the present invention provides multiple adjustment ranges that can be realized when the float mechanism is assembled. The present adjustment mechanism may consist of a screw that has a plurality of parallel threads allowing for a plurality of rotational orientations for assembly of the float onto the screw. Features on the float and locking element are keyed to the orientation of the screw to provide mechanical stops that define the limits of float adjustment. These mechanical stops provide a plurality of float adjustment ranges corresponding to the plurality of rotational orientations of the float assembled to the screw.

An advantage of the present invention is that adjustments can be made simply and intuitively by rotating a knob with respect to a visible indicator, such as a dial. The rotational position of the knob directly corresponds to a prescribed height of the float. Other typical float adjustment mechanisms do not have this correspondence. As a result, the knob itself, or other element on the screw, is a visual indicator of float position and the float itself need not be readily observed to accomplish the float adjustment.

Another advantage of the present system when applied to toilets is that the hand of the person making the adjustment remains relatively high in the toilet tank. Submerging the hand deep into the toilet tank may be unpleasant and undesirable, and this is minimized by the present invention.

Moreover, the float adjustment mechanism of the present invention allows for automatic locking and unlocking of the float. By providing an intuitive adjustment and locking capability the present invention makes adjusting float heights simple, intuitive, and convenient.

DETAILED DESCRIPTION OF THE DRAWINGS

Exemplary embodiments of the inventions are described below. The figures are not necessarily drawn to scale and do not necessarily show every detail or structure of the various embodiments of the inventions, but rather illustrate exemplary embodiments and mechanical features in order to provide an enabling description of such embodiments.

In various aspects of the invention, a float adjustment mechanism is provided, comprising a float, an adjustment mechanism (such as a multi-fluted screw), and a sliding locking element. In various embodiments, the float adjustment knob may be a separate element or an integral feature of the sliding locking element. When the knob is pressed downward, the locking element unlocks the float from the it. Then, turning the adjustment knob moves the adjustment mechanism, thereby resulting in vertical motion of the float.

Figure 1:
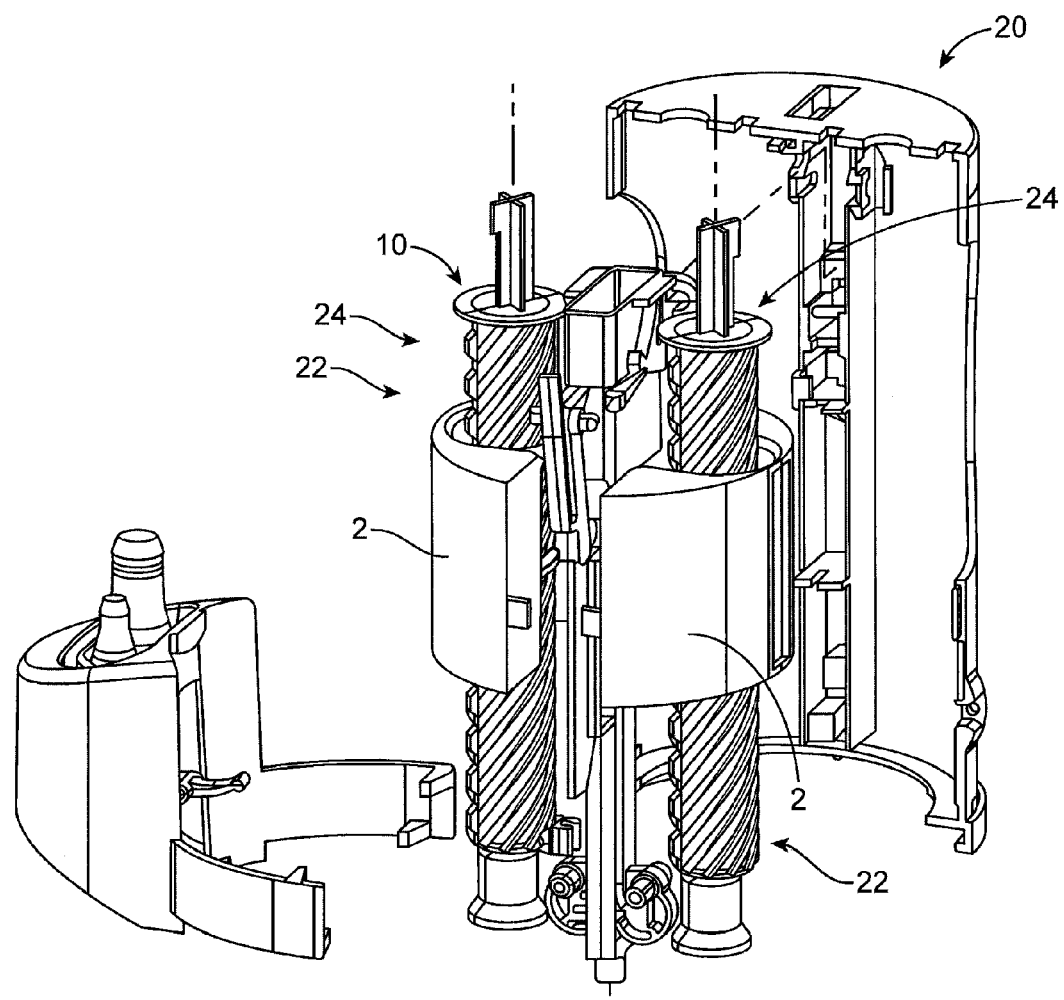
FIG. 1 shows a partial exploded view of the present float assembly installed in a dual flush valve.

Referring first to FIG. 1, a float adjustment assembly 10 is shown installed within a flush valve 20. As illustrated, flush valve 20 may preferably be a dual flush valve. However, it is to be understood that flush valve 20 may instead be a traditional single flush valve as the present invention also can be used to adjust the height of a single float. As such, the present claims cover both single and double float flush valve embodiments (any other non-toilet applications).

In preferred embodiments, the present invention provides a toilet valve float adjustment assembly 10, comprising: a dual flush valve 20 and a pair of floats 2. The vertical position of one of floats 2 determines the flush volume for a full flush and the vertical position of the other float 2 determines the flush volume for a partial flush. Also included are a pair of adjustment mechanisms 22, wherein each adjustment mechanism 22 adjusts the vertical height of one of the floats 2. Also included are a pair of locking mechanisms 24, wherein each locking mechanism 24 inhibits movement of one of adjustment mechanisms 22, thereby keeping its associated float 2 at its preferred vertical height when locked. As will be shown, the adjustment mechanisms 22 and locking mechanisms 24 can both be controlled right at the top of the dual flush valve (by knobs 12 in FIG. 5).

Figure 2:
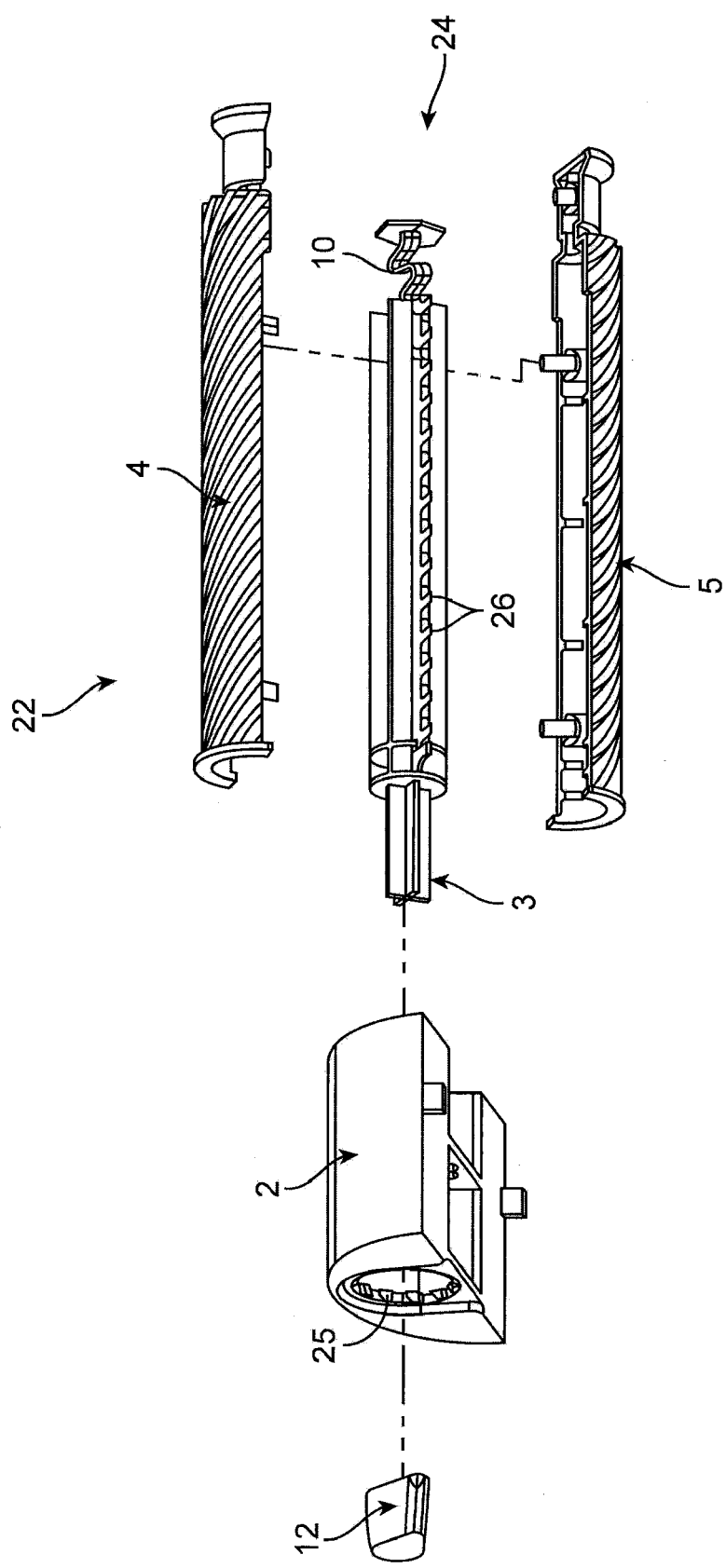
FIG. 2 shows an exploded view of the adjustment and locking mechanism of the float adjustment mechanism.

Referring next to FIG. 2, each adjustment mechanism 22 may comprise: an adjustment screw (see screw halves 4 and 5) with an outer thread that engages a thread-receiving surface 25 on float 2. As such, when the adjustment screw (4,5) is rotated, its associated float 2 slides vertically up or down along the adjustment screw. As can also be seen, adjustment screw (4,5) preferably passes through the center of float 2. A rotatable adjustment knob 12 attaches to the end of elongated member 3. Elongated member 3 preferably has nubs 26 extending therefrom. Elongated member 3 slides vertically between screw halves 4 and 5 from a locked position to an unlocked position.

Figure 3:
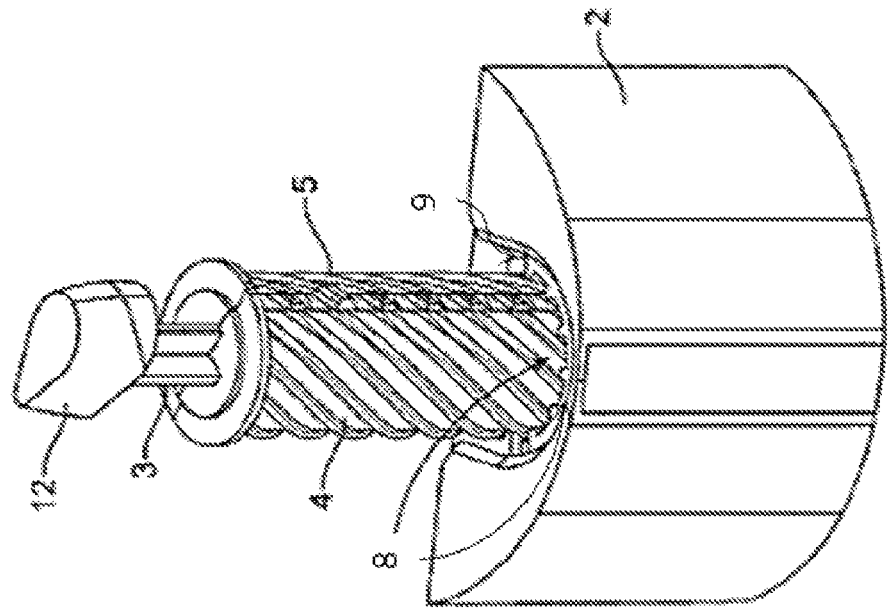
FIG. 3 shows side and perspective views of the locking features of the present float adjustment mechanism.
Figure 3:
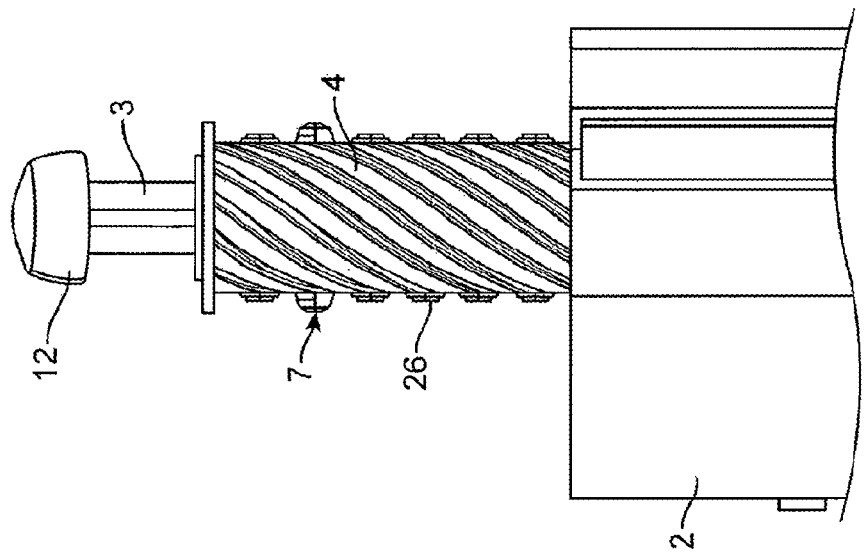

As seen in FIG. 3, when elongated member 3 is in a locked position, nubs 26 protrude between the threads of the adjustment screw (4,5) preventing screw (4,5) from rotating. Conversely, when elongated member 3 is in an unlocked position, nubs 26 align with the threads of the adjustment screw allowing the screw to rotate. Specifically, nubs 26 align with the threads of screw halves 4 and 5 when the float is unlocked. Nubs 26 pass through grooves 8 (on float 2) along with the threads of screw halves 4 and 5 to allow rotational motional relative to float 2 resulting in vertical height adjustment of float 2. Conversely, when nubs 26 are positioned in-between the threads of screw halves 4 and 5 nubs 26 do not align with grooves 8 and do not allow rotational motion relative to float 2 resulting in locking of float 2.

Figure 4:
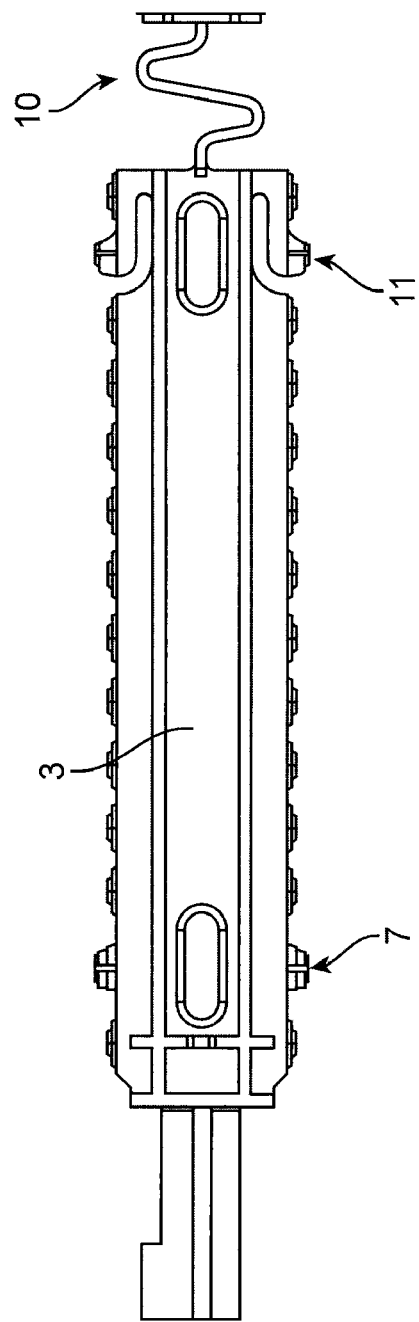
FIG. 4 shows additional details of the locking mechanism.

Referring to FIGS. 3 and 4, optional large nubs 7 and 11 are selectively oriented on elongated member 3 to allow two different float adjustment ranges for the float assembly. It should be noted that the present invention is not limited to two adjustment ranges, and the embodiment shown reflects just one possible implementation. In one float adjustment range, nubs 26 pass through large grooves 9 to allow float 2 to move longitudinally toward rotatable knob 12 on screw halves 4 and 5. However, large nubs 11 do not align with large grooves 9 thus preventing float 2 from moving longitudinally the full length of screw halves 4 and 5. In another float adjustment range, nubs 11 do align with large grooves 9. This allows float 2 to travel the full length of screw halves 4 and 5 in a direction away from knob 12 but not the full length of the screw away from knob 12. In this way, two different float height adjustment ranges can be achieved with the same float adjustment mechanism 22. Thus, the float height adjustment range is determined by selectively orienting the rotational position of float 2 relative to screw halves 4 and 5 at the time of assembly.

Figure 5:
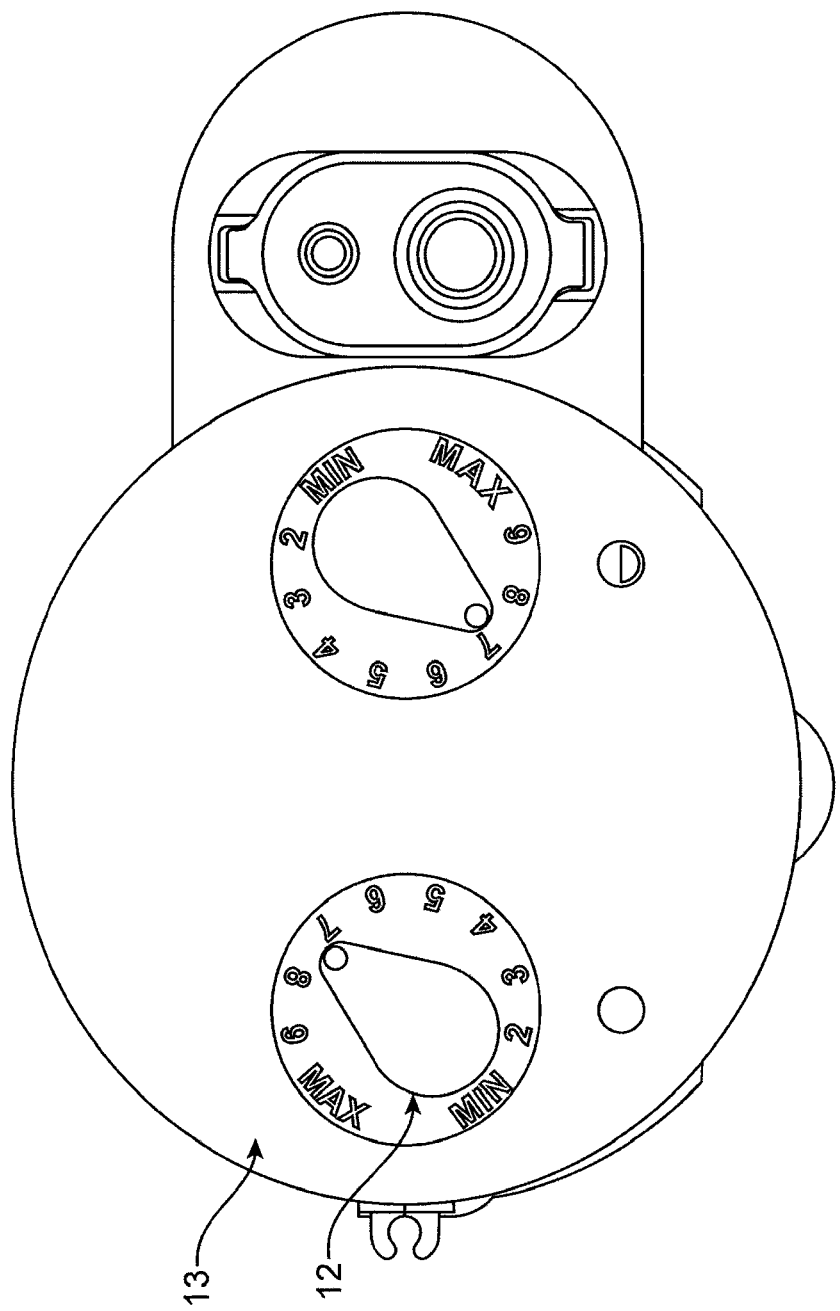
FIG. 5 shows a top plan view of the pair of adjustment knobs with their corresponding visual indicators.

Referring to FIGS. 5 and 2, knob 12 is rotated to adjust the float. Visual indicator 13 shows the relative position of float 2 based on the position of knob 12. Pressing down on knob 12 disengages elongated member 3 and allows rotation in order to adjust the vertical height of float 2. Releasing knob 12 locks float 2 in position. Thus, each pair of adjustment and locking mechanisms (22, 24) are controlled together by a single adjustable control knob 12 (being a rotatable knob on the top of the dual flush valve). Thus, a user simply depresses knob 12 to first unlock the locking mechanism and then move the adjustment mechanism 22 to adjust the vertical height of one of the floats. In preferred embodiments, the full vertical range of motion of each float is adjusted by the adjustment knob rotating through no more than 360 degrees.

As can also be seen in FIGS. 3 and 4, elongated member 3 further comprises a spring bias 10 that urges the elongated member upwards into its locked position (such that nubs 26 do not align with grooves 9). Whereas spring bias 10 pushes elongated member 3 upwards into the locked position, an operator can instead overcome this force and push elongated member 3 down into the unlocked position, simply by depressing knob 12, (such that nubs 26 do not align with grooves 9). Next, the operator turns knob 12, thereby turning adjustment screw (4,5), causing the float 2 to move up or down, as desired.

What is claimed is:

1. A float adjustment assembly, comprising:
   a float;
   an adjustment mechanism received and surrounded by the float, wherein axially rotating the adjustment mechanism causes the float to translate along the adjustment mechanism to adjust a vertical height of the float; and
   a locking mechanism received and substantially surrounded by the adjustment mechanism, wherein the locking mechanism inhibits movement of the adjustment mechanism to lock the float at a preferred vertical height, and
   wherein rotation of the adjustment mechanism and movement of the locking mechanism are controlled together by a moveable control disposed above and axially aligned with the adjustment and locking mechanisms, and wherein the moveable control is depressed to unlock the locking mechanism and rotated to adjust the preferred vertical height of the float.

2. The float adjustment assembly of claim 1, further comprising: a toilet flush valve, wherein the float is disposed substantially within the toilet flush valve and wherein the moveable control is a rotatable knob disposed on top of the toilet flush valve.

3. The float adjustment assembly of claim 2, wherein the toilet flush valve is a dual flush valve, further comprising:
   a second float disposed substantially within the dual flush valve;
   a second adjustment mechanism received and surrounded by the second float, wherein rotating the second adjustment mechanism causes the second float to translate along the second adjustment mechanism adjusting a vertical height of the second float; and
   a second locking mechanism received and substantially surrounded by the second adjustment mechanism, wherein the second locking mechanism inhibits movement of the second adjustment mechanism to lock the second float at a preferred vertical height,
   wherein rotation of the second adjustment mechanism and movement of the locking mechanism are controlled together by a second moveable control disposed above and axially aligned with the second adjustment and locking mechanisms, and
wherein the first and second moveable controls are rotatable about a longitudinal axis of respective floats and are disposed on top of the dual flush valve.

4. The float adjustment assembly of claim 3, wherein the moveable control is depressed to unlock the locking mechanism and rotated about a shared axis of the adjustment and locking mechanisms to adjust the preferred vertical height of the float.

5. The float adjustment assembly of claim 1, wherein a rotational position of the moveable control corresponds to a vertical position of the float.

6. The float adjustment assembly of claim 5, the locking mechanism comprises an elongated member between the adjustment mechanism with external threads operable to engage with the float,
wherein the elongated member slides vertically inside the adjustment mechanism from a locked position preventing the adjustment mechanism from rotating to an unlocked position so that the threads of the adjustment mechanism rotate to vertically position the float, and
wherein a full vertical range of the float is adjusted by the rotating the moveable control through no more than 360 degrees.

7. A float adjustment assembly, comprising:
a float:
an adjustment mechanism received by the float, wherein the adjustment mechanism adjusts a vertical height of the float; and
a locking mechanism received by the adjustment mechanism, wherein the locking mechanism inhibits movement of the adjustment mechanism to lock the float at a preferred vertical height, and
wherein the adjustment and locking mechanisms are controlled together by a moveable control disposed above and aligned with the float;
wherein, the adjustment mechanism comprises an adjustment screw with external threads that engage a thread-receiving surface of the float, such that when the adjustment screw is rotated, the float slides vertically along the adjustment screw, and wherein
the locking mechanism comprises an elongated member comprising one or more nubs extending therefrom positioned between two halves of the adjustment screw, wherein the elongated member slides vertically from a locked position at which the nubs protrude between the threads of the adjustment screw preventing the adjustment screw from rotating, to an unlocked position at which the nubs align with the threads of the adjustment screw allowing the screw to rotate.

8. The float adjustment assembly of claim 7, wherein the locking mechanism further comprises: a spring bias that urges the elongated member into the locked position.

9. The float adjustment assembly of claim 8, wherein the spring bias pushes the elongated member upwards into the locked position, wherein the elongated member is depressed down into the unlocked position.

10. The float adjustment assembly of claim 7, wherein the moveable control is depressed to unlock the locking mechanism, and the moveable control is rotated to rotate the adjustment screw.

11. A float adjustment assembly, comprising:
a float;
an adjustment mechanism that adjusts the vertical height of the float, wherein the adjustment mechanism comprises an adjustment screw with a thread that engages a thread-receiving surface on the float, such that when the adjustment screw is rotated, the float slides vertically along the adjustment screw; and
a locking mechanism that inhibits movement of the adjustment mechanism, thereby keeping the float at a preferred vertical height when locked,
wherein the locking mechanism comprises an elongated member having nubs extending therefrom positioned between two halves of the adjustment screw,
wherein the elongated member slides vertically from a locked position at which the nubs protrude between the threads of the adjustment screw preventing the screw from rotating, to an unlocked position at which the nubs align with the threads of the adjustment screw allowing the screw to rotate.

12. A toilet valve float adjustment assembly, comprising:
a flush valve;
a float disposed substantially within the flush valve, wherein a vertical position of the float determines the flush volume;
an adjustment mechanism received and substantially surrounded by the float, wherein rotating the adjustment mechanism causes the float to translate along the adjustment mechanism and adjusts the vertical position of the float; and
a locking mechanism received and substantially surrounded by the adjustment mechanism,
wherein the locking mechanism inhibits movement of the adjustment mechanism, thereby maintaining the float at a preferred vertical height when locked, and
wherein rotation of the adjustment mechanism and movement of the locking mechanism are controlled together by a knob at a top of the flush valve, and wherein vertical movement of the knob unlocks the locking mechanism and rotation of the adjustment mechanism adjusts the vertical height of the float.

13. The assembly of claim 12, wherein the knob is depressed to unlock the locking mechanism and rotated about a rotational axis of the float to adjust the preferred vertical height of the float.

14. The assembly of claim 12, wherein the adjustment mechanism comprises: an adjustment screw with external threads that engage a thread-receiving surface of the float, such that when the adjustment screw is rotated, the float slides along the adjustment screw.

15. The assembly of claim 14, wherein a full vertical range of motion of the float is adjusted by the knob rotating through no more than 360 degrees.

16. The assembly of claim 15, wherein the locking mechanism comprises: an elongated member having one or more nubs extending therefrom positioned between two halves of the adjustment screw,
wherein the elongated member slides vertically from a locked position at which the one or more nubs protrude between the threads of the adjustment screw preventing the screw from rotating, to an unlocked position at which the nubs align with the threads of the adjustment screw allowing the screw to rotate.

17. The assembly of claim 16, wherein the locking mechanism further comprises: a spring bias that urges the elongated member into the locked position.

18. The assembly of claim 14, wherein the knob is rotated to turn the adjustment screw.

19. A system for adjusting height of a body, comprising:
a body;
an adjustment mechanism received and surrounded by the body, wherein the adjustment mechanism adjusts a vertical height of the body; and
a locking mechanism received and substantially surrounded by the adjustment mechanism, wherein the locking mechanism inhibits movement of the adjustment mechanism to lock the body at a preferred vertical height, and
wherein the adjustment and locking mechanisms are controlled together by a moveable control disposed above and axially aligned with the adjustment and locking mechanisms, and wherein the moveable control is depressed to unlock the locking mechanism and rotated to adjust the preferred vertical height of the float.

* * * * *